UNITED STATES PATENT OFFICE.

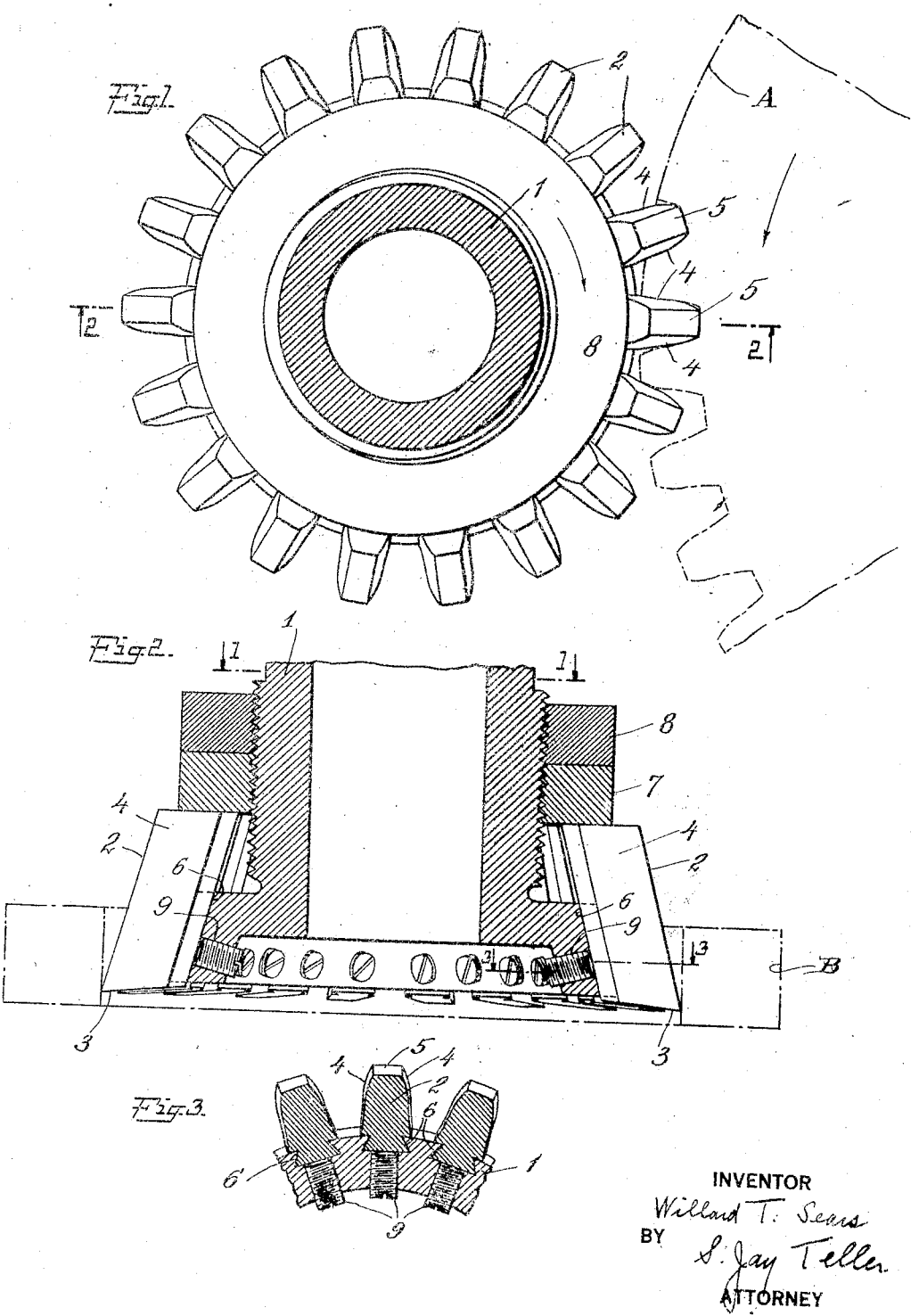

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

GEAR-CUTTER.

1,392,361.

Specification of Letters Patent.   Patented Oct. 4, 1921.

Application filed March 17, 1919. Serial No. 283,170.

*To all whom it may concern:*

Be it known that I, WILLARD T. SEARS, a citizen of the United States, residing at Montclair, in the county of Essex and State of New Jersey, have invented certain new and useful Improvements in Gear-Cutters, of which the following is a specification.

This invention relates to a gear cutter of the axially reciprocating tooth-curve-generating type, the cutter having an effective contour which is the same as that of a gear of the same pitch diameter. The object of the invention is to provide a cutter having teeth which are adjustable so as to maintain the pitch diameter of the cutter the same notwithstanding reduction of the teeth by grinding for the purpose of sharpening.

In the accompanying drawing I have shown the embodiment of the invention which I now deem preferable, but it will be understood that the drawing is intended to be illustrative only and is not to be construed as defining or limiting the scope of the invention, the accompanying claims being relied upon for that purpose.

Of the drawing:

Figure 1 is a plan view of a cutter embodying the invention.

Fig. 2 is a vertical sectional view taken along the line 2—2 of Fig. 1.

Fig. 3 is a horizontal sectional view taken along the line 3—3 of Fig. 2.

Referring to the drawing, 1 represents the body part of the cutter and 2, 2 a circular series of cutting teeth carried by the body. Each tooth 2 is provided with a bottom cutting face 3 which is perpendicular or substantially perpendicular to the axis of the cutter. Preferably the cutting face is slightly inclined with respect to the perpendicular, as shown, so as to provide a suitable rake. Each tooth is suitably relieved upward and inward from the cutting face, and is provided at the cutting face with an effective shape corresponding to that of a gear tooth. Preferably the lateral relief faces 4, 4 and 5 are formed of straight lines extending upward and inward from the edges of the cutting face. It will be seen that while the effective shape of each cutting tooth corresponds to that of a gear tooth, the actual shape at a horizontal plane of intersection is slightly different because of the inclination of the bottom cutting face 3. The actual cross-sectional shape is the same at all horizontal planes, and the effective shape therefore remains unchanged after grinding, provided that the angle of the cutting face is kept the same.

The several cutting teeth 2 are suitably mounted on the body 1 and are equally spaced so as to provide a composite effective contour which is substantially the same as that of a gear. In use the cutter is axially reciprocated and is at the same time turned slowly about its axis. A gear blank A to be cut is placed in operative relationship with the cutter so that the pitch line of the proposed gear tooth lies tangent to the pitch line of the cutter. The blank is turned in unison with the cutter so that the two pitch circles roll together. The result of the reciprocating movement of the cutter combined with the rolling movement between the cutter and the blank is the generation of properly formed gear teeth on the blank, as indicated in Fig. 1. This method of tooth formation is well known and further explanation is not needed.

In cutters of this general type, as heretofore constructed, difficulty has been experienced by reason of the reduction of the pitch diameter when the teeth are sharpened. The teeth must be relieved, and it is obvious that any reduction of the teeth at the cutting faces tends to reduce the diameter of the cutter. I avoid the difficulties heretofore expressed by making the cutting teeth separate from the body of the cutter and mounting them so that they can be adjusted to compensate for any tendency toward a decrease of diameter. In the construction, as shown, the teeth are mounted in dovetailed guide grooves 6 formed at regular intervals around the lower main portion of the body. These guide grooves are inclined, being parallel to the relief lines which constitute the lateral faces 4, 4 and 5. It will be seen that when the teeth are reduced by grinding the cutting faces 3, they can be moved downward and outward until the original diameter is restored. In grinding care must be taken not to change the angles of the cutting faces.

I preferably provide means for adjusting all of the teeth simultaneously and in unison, and as shown this means comprises a nut 7 engaging the upper threaded portion of the body 1. This nut contacts with the upper ends of all of the teeth 2, and when the nut is turned all of the teeth are moved downward and outward to the same extent. Preferably a lock nut 8 is associated with the nut 7 for locking it in place after the teeth have been properly adjusted. When the teeth are adjusted in unison as described care must be taken to grind all of them to the same extent, so as to keep their lengths uniform. Preferably the teeth are ground in place in the body by means of a suitable grinding machine.

I preferably provide means supplemental to the nut 7 for holding the several teeth in adjusted positions. This means consists of a set screw 9 adjacent each tooth. The several set screws are loosened when the teeth are to be adjusted, and after adjustment they are tightened to hold the teeth firmly in the desired positions.

It will be seen that with my improved construction the teeth can all be ground on their cutting faces 3, care being taken to maintain the rake angle the same. After the teeth have all been ground to the same extent, they can then be adjusted by means of the nut 7 so that the cutter will have the initial pitch diameter and the initial composite contour. If desired, a ring gage such as B may be used for determining the diameter and limiting the adjustment of the teeth.

What I claim is:

1. A circular gear cutter of the axially reciprocating and tooth-curve-generating type, comprising a circular series of radially extending adjustable cutting teeth having contours of gear tooth form on their end faces.

2. A circular gear cutter of the tooth-curve-generating type, comprising a circular series of radially extending cutting teeth each formed on its end with an effective shape corresponding to that of a gear tooth, and means for adjusting the teeth to maintain the same diameter notwithstanding grinding.

3. A circular gear cutter of the axially reciprocating and tooth-curve-generating type, comprising a circular series of relieved teeth each having a cutting face substantially perpendicular to the axis and each formed at the cutting face on its end with an effective shape corresponding to that of a gear tooth, and means for adjusting the teeth to maintain the same diameter notwithstanding grinding on the cutting faces.

4. A circular gear cutter of the axially reciprocating and tooth-curve-generating type, comprising a circular series of relieved teeth each having a cutting face substantially perpendicular to the axis and each formed at the cutting face on its end and at planes of intersection back of the cutting face with an effective shape corresponding to that of a gear tooth, and means for adjusting the teeth to maintain the same diameter notwithstanding grinding on the cutting faces.

5. A circular gear cutter of the axially reciprocating and tooth-curve-generating type, comprising a circular series of relieved teeth each having a cutting face substantially perpendicular to the axis and each formed at the cutting face on its end and at planes of intersection back of the cutting face with an effective shape corresponding to that of a gear tooth, and means for adjusting the teeth in the directions of the lines of relief to maintain the same diameter notwithstanding grinding on the cutting faces.

6. A circular gear cutter of the axially reciprocating and tooth-curve-generating type, comprising a circular series of teeth each having a cutting face substantially perpendicular to the axis and having straight lateral relief faces, each tooth being formed at the cutting face on its end and at planes of intersection back of the cutting face with an effective shape corresponding to that of a gear tooth, and means for adjusting the teeth in the directions of the straight relief faces to maintain the same diameter notwithstanding grinding on the cutting faces.

7. A circular gear cutter of the axially reciprocating and tooth-curve-generating type, comprising a body, and a circular series of teeth engaging the body and adjustable along straight lines inclined with respect to the axis, each tooth having a cutting face on its end substantially perpendicular to the axis and provided with an effective gear-tooth shape and each tooth having straight lateral relief faces extending in the direction of the corresponding line of adjustment.

8. A circular gear cutter of the axially reciprocating and tooth-curve-generating type, comprising a body, a circular series of teeth engaging the body and adjustable along straight lines inclined with respect to the axis, each tooth having a cutting face on its end substantially perpendicular to the axis and provided with an effective gear tooth shape and each tooth having straight lateral relief faces extending in the direction of the corresponding line of adjustment, and means carried by the body for adjusting all of the teeth in unison.

9. A circular gear cutter of the axially reciprocating and tooth-curve-generating type, comprising a body having an upper threaded portion and a lower main portion provided with a circular series of inclined guide grooves, a series of teeth respectively adjustable along the said guide grooves, each tooth having a cutting face on its end substantially perpendicular to the axis and provided with an effective gear tooth shape and each tooth having straight lateral relief faces extending in the direction of the corresponding guide groove, and a nut fitting the threading portion of the body and engaging the teeth to adjust them in unison.

10. A circular gear cutter of the axially reciprocating and tooth-curve-generating type, comprising a body having an upper threaded portion and a lower main portion provided with a circular series of inclined guide grooves, a series of teeth respectively adjustable along the said guide grooves, each tooth having a cutting face on its end substantially perpendicular to the axis and provided with an effective gear tooth shape and each tooth having straight lateral relief faces extending in the direction of the corresponding guide groove, a nut fitting the threading portion of the body and engaging the teeth to adjust them in unison, and means supplemental to the nut for locking the several teeth against movement with respect to the body.

In testimony whereof, I hereto affix my signature.

WILLARD T. SEARS.